Figure 1:
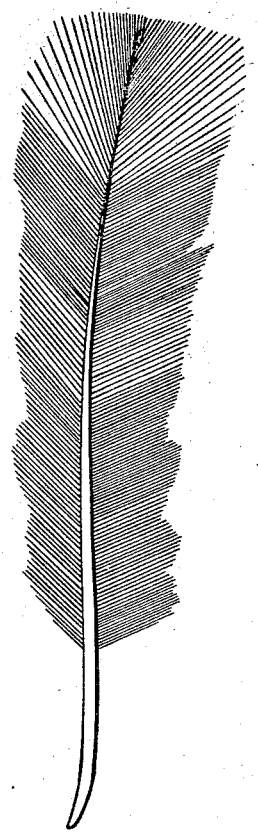

E. B. DYER.
Feather.

No. 222,128.   Patented Dec. 2, 1879.

WITNESSES
James N. Coyne
Jo. P. Whiting

INVENTOR
Edward B. Dyer
By Coyne and Elliott
Attorneys

UNITED STATES PATENT OFFICE.

EDWARD B. DYER, OF CHICAGO, ILLINOIS, ASSIGNOR OF ONE-HALF OF HIS RIGHT TO ALBERT RANSOM, OF SAME PLACE.

IMPROVEMENT IN FEATHERS.

Specification forming part of Letters Patent No. 222,128, dated December 2, 1879; application filed September 26, 1879.

*To all whom it may concern:*

Be it known that I, EDWARD B. DYER, of Chicago, county of Cook, and State of Illinois, have invented certain new and useful Improvements in Feathers for Dusters and other Purposes, of which the following is a specification.

My invention relates to feathers used for dusters and other similar articles, and also for trimming purposes—as, for instance, when used for trimming hats, bonnets, &c.

Heretofore feathers have been prepared, when used for the purposes above described, by splitting off the rib upon the under side of the quill, and extracting the pith, so that they will be made lighter, and have more pliability than when in their original state. They have also had their quills flattened by passing them between pressure-rollers, to give them additional pliability and render them capable of being more firmly secured to the article to which they are attached when a wrapping-cord is used.

It will be seen that by either of the above means the quill is more or less weakened, and that it can have, when in use, little or no lateral movement. So far as the latter is concerned, the same occurs with the quill of a feather in its natural state. The result of this is, that when the feather is used for trimming or other similar purposes it is liable, when accidentally bent laterally, to have its quill broken, thereby unfitting it for further use. The same also occurs when used in dusters, where a further objection to them when used for this purpose is, that they are of but little service when used for dusting purposes, except when the flat portion of the feather is in contact with the surface to be dusted.

In dusting finely-polished surfaces there is also a liability of the same being scratched by the exposed quill.

The object of my invention is to produce a feather the quill of which will have uniform elasticity, combined with strength to a greater degree than it possesses in its original state, and to have the same concealed within its plumage.

A further object of my invention is to produce a feather having a quill of not only greater elasticity and strength, but less weight, than when in its original state.

My invention consists, first, of the process for treating feathers, which consists of first flattening or splitting the quill and extracting the pith, then winding the quill spirally about itself while in a heated state; second, of a feather having its quill wound spirally about itself, either partly of or its entire length, whereby it is strengthened and given an equal pliability in any direction it may be bent.

Figure 2:
Figure 3:

In the accompanying drawings, Figure 1 shows a feather with the quill in its natural state. Fig. 2 is a view of a feather as it appears after the quill is twisted or wound spirally about itself. Fig. 3 is a view of the quill when thus wound.

In preparing a feather to coil its quill I may flatten the same, in its original state, by means of pressure-plates or by passing it between weighted rollers, &c.; or I may split off the ridge of the quill, and, with or without extracting the pith or flattening it, have it in the condition necessary preparatory to coiling. I then heat the quill thus prepared, by placing it in contact with heated plates, by steam or any other suitable means, and while heated I coil the quill about itself to form a spiral. The object of thus heating the quill is to make it retain the form given it; otherwise it would resume its original shape. The quill may be twisted or coiled by hand, or by anything most convenient for this purpose.

It will be seen from the above description that when the quill is twisted after the flattening process it will not only possess greater strength, by reason of a double-walled hollow tube thus formed, but will be equally pliable in every direction. If the quill is split and wound about itself without extracting the pith it will possess nearly its original strength to resist a pressure to flatten it, and the desired flexibility, together with a diminished weight; or if the quill is split and the pith extracted, as I usually prefer to do, it will have the same kind of pliability—*i. e.*, in all directions—to a greater degree, and will be further reduced in weight.

By thus twisting the quills the plumage is evenly and uniformly distributed about them, so that when used in dusters they cannot come in contact with and scratch the surface to be dusted, and the plumage thus thickened will have greater dusting power.

I do not wish to confine myself to a particular manner of heating or twisting the quill, nor to coiling the quill its entire length, for in some cases I find it only necessary to coil it a short distance from its lower or butt end to give it the required pliability—as, for instance, in making dusters I may coil it only a distance sufficient to permit the coiled portion to project slightly beyond the head to which the quills are secured.

Having thus described my invention, what I claim, and desire to secure by Letters Patent, is—

1. In the treatment of feathers, the process substantially as described, which consists in first flattening or splitting the quill, and with or without extracting the pith, then winding the quill spirally about itself while in a heated state, as and for the purposes described.

2. As a new article of manufacture, a feather having its quill wound spirally about itself partly of its length, whereby said quill is strengthened and given an equal pliability in any direction, substantially as described.

3. As a new article of manufacture, a feather having its quill wound spirally about itself its entire length, with the feather edge wound about the length of said quill between its butt and tip end, substantially as described, and shown in Fig. 2 of the drawings.

EDWARD B. DYER.

Witnesses:
JOHN G. ELLIOTT,
JOS. P. WHITING.